United States Patent [19]

Murrell et al.

[11] 4,169,883

[45] Oct. 2, 1979

[54] PROCESS FOR PREPARING ULTRA-STABLE, HIGH SURFACE AREA ALPHA-ALUMINA

[75] Inventors: Lawrence L. Murrell, Elizabeth; Dane C. Grenoble, Plainfield, both of N.J.; John P. DeLuca, Chesterfield, Mo.

[73] Assignee: Exxon Research & Engineering Co., Florham Park, N.J.

[21] Appl. No.: 927,827

[22] Filed: Jul. 25, 1978

[51] Int. Cl.$^2$ ............................................... C01F 7/02
[52] U.S. Cl. ................................. 423/628; 252/463; 208/123; 208/124
[58] Field of Search ............................... 423/625, 628

[56] References Cited

U.S. PATENT DOCUMENTS

| 2,697,066 | 12/1954 | Sieg | 208/120 |
|---|---|---|---|
| 3,726,811 | 4/1973 | Toombs et al. | 423/628 |
| 3,781,221 | 12/1973 | Kominami et al. | 252/432 |
| 3,898,322 | 8/1975 | Leach | 423/628 |
| 3,908,002 | 9/1975 | Holler | 423/628 |
| 3,933,685 | 1/1976 | Madderra et al. | 252/465 |
| 3,954,763 | 5/1976 | Morimoto | 252/465 |
| 3,966,893 | 6/1976 | Dewff et al. | 423/628 |
| 3,975,509 | 8/1976 | Royer et al. | 423/628 |
| 4,012,337 | 3/1977 | Mitchell | 423/628 |
| 4,032,433 | 6/1977 | Petri et al. | 252/477 |

FOREIGN PATENT DOCUMENTS 838067 7/1976 Belgium .
4045995 12/1969 Japan .

*Primary Examiner*—Herbert T. Carter
*Attorney, Agent, or Firm*—David W. Collins

[57] ABSTRACT

The preparation of an ultra-stable, high surface area alpha-alumina catalyst and catalyst support suitable for use in high temperature processes such as petroleum refining processes, e.g., resid cat cracking and steam reforming, is disclosed. The process comprises impregnating high surface area gamma-alumina having narrow pores with a carbonaceous material that readily chars to form carbon. The impregnated alumina is then heated to a temperature sufficient to induce charring, following which the gamma-alumina is converted to alpha-alumina by further heating. The carbon is subsequently removed by oxidation. The alpha-alumina thus produced can withstand temperatures up to at least about 1000° C. in the presence of steam without substantial loss of surface area.

14 Claims, No Drawings

PROCESS FOR PREPARING ULTRA-STABLE, HIGH SURFACE AREA ALPHA-ALUMINA

BACKGROUND OF THE INVENTION

1. Field of the Invention

The invention relates to the production of high surface area alpha-alumina suitable as a catalyst and catalyst support and, in particular, to the production of high surface area alpha-alumina having high temperature stability.

2. Description of the Prior Art

Aluminum oxide, or alumina, in several forms (anhydride or hydrated, crystalline or amorphous) has been known for many years. Various forms of alumina occur in nature and many have been produced synthetically. Certain forms of alumina have proven outstanding for use as catalysts and as catalyst supports and consequently have found extensive use in the petroleum refining industry. For example, the gamma form of alumina ($\gamma$-$Al_2O_3$), composited with a noble metal or mixture of such metals with each other or with other metals, has been widely used in reforming processes because, inter alia, of its high surface area, heat stability and surface acidity and because it can be prepared in very pure form.

Alpha-alumina ($\gamma$-$Al_2O_3$) is a chemically and thermally stable form of alumina which has been known for many years. It is well-known that all other forms of alumina can be converted to alpha-alumina; see, e.g. "Oxides and Hydroxides of Alumina", K. Wefers et al, Tech Paper No. 19, Alcoa Research Laboratories (1972), pp. 36–45. Alpha-alumina is widely available and can be prepared in very pure form. Because of its high thermal stability, alpha-alumina is particularly widely used in the manufacture of ceramics. However, despite the wide availability and its unusually high thermal stability, alpha-alumina has found little use in petroleum refining operations because of its relatively low surface area (typically less than about 2 $m^2/g$).

In recent years, efforts have been devoted to developing processes for producing alpha-alumina having a high surface area in order to take advantage of its high thermal stability properties for use in petroleum refining operations. Exemplary of such developments are U.S. Pat. Nos. 4,012,337, 3,908,002 and 3,726,811. The latter patent describes the preparation of an alpha-alumina with a surface area of at least 40 $m^2/g$. This is achieved by impregnating an alumina xerogel with a minor amount of a carbonizable material, e.g., a starch or sugar such as sucrose. Impregnation is followed by carbonization, conversion to the alpha-phase and finally removal of carbon. The alpha-alumina thus produced may be used as a catalyst or catalyst support in processes that are carried out at about 800° C. or lower.

U.S. Pat. No. 3,726,811 represents an advance in the art of producing high surface area alpha-alumina, but nonetheless suffers from two disadvantages. First, the conversion to alpha-alumina must be carried out at a very high temperature—greater than 1300° C. Second, the alpha-alumina thus produced is useful in catalytic reactions occurring only at temperatures of about 800° C. and lower. While this limitation is of little consequence in most catalytic processes, there are some catalytic processes which require higher temperatures, typically on the order of 1000° C. or so. Such reactions include resid cat cracking, which requires regeneration temperatures of about 800° to 1000° C. and steam reforming, a severe process which requires temperatures of greater than 800° C.

SUMMARY OF THE INVENTION

In accordance with the invention, ultra-stable, high surface area alpha-alumina is prepared by a process which comprises:

(a) contacting high surface area gamma-alumina having a narrow average pore size of about 20 to 100 Angstroms with a solution of a carbonaceous material;

(b) carbonizing the carbonaceous material at a temperature of at least about 400° C. for a period of time of at least about 0.5 hours in an inert or reducing atmosphere;

(c) converting the gamma-alumina to alpha-alumina at a temperature of at least about 1150° C. for a period of time of greater than about 2 hours in an inert or reducing atmosphere; and (d) removing carbon in the alpha-alumina by heat treating at a temperature of at least about 500° C. for a period of time of at least about 0.25 hours in an oxidizing atmosphere.

The alpha-alumina formed in accordance with the invention has a high surface area of at least about 20 $m^2/g$ and is capable of withstanding temperatures up to at least about 1000° C. in the presence of steam without substantial loss in surface area. This latter capability renders the alpha-alumina produced in accordance with the invention particularly useful in those petroleum refining operations requiring catalysts or catalyst supports employed in high temperature operations, such as resid cat cracking and steam reforming.

DETAILED DESCRIPTION OF THE INVENTION

The starting material of the process of the instant invention is gamma-alumina extrudate of high purity, such as reforming grade, whereby impurities such as sodium, silicon, potassium and the like are maintained at low levels. The process of the invention requires that the pore diameter of the gamma-alumina extrudate have an average value of about 20 to 100 Angstroms. Such materials are commonly referred to as having a small and narrow pore size distribution. This is in contrast to wide pore diameter gamma-alumina extrudate, which has average pore diameters ranging from about 130 to 300 Angstroms. Such wide pore diameter material has been found unsuitable for the process of the invention. The pore diameter is determined by nitrogen pore volume analysis, which is a standard technique for such small pore sizes; see, e.g., "Adsorption, Surface Area and Porosity", S. J. Gregg and K. S. W. Sing, Academic Press, N.Y. 1967.

Extrudates are preferred in many petroleum processes. The extrudate form allows free flow through a packed catalyst bed, thereby minimizing pressure drop and plugging problems in fixed bed reactor designs. Further, the extrudate form has a high crush strength and resists compacting.

The gamma-alumina extrudate is impregnated with a carbonaceous material, preferably non-graphitizing, that readily chars to form carbon. Examples of such carbon-forming materials include carbohydrates such as starches and sugars. A particularly preferred sugar is sucrose. Other carbon-forming carbonaceous materials are well-known to those skilled in the art.

Impregnation of the carbonaceous material into the gamma-alumina extrudate is conveniently accomplished by employing a solution of the carbonaceous material. Water is particularly preferred as a solvent. It is desired that as much carbonaceous material as possible be employed in order to maximize the amount of charred carbon in the pores. This helps maintain integrity and surface area of the pores during subsequent processing. The amount of carbonaceous material added is conveniently stated in terms of the amount of carbon remaining following the charring stage, since the carbon remaining is the active component in the pores of the gamma-alumina and prevents collapse of the pores during transition from the gamma to the alpha-phase. The amount of carbon following the charring stage should range from about 1 to 25 wt. % of alumina, and preferably about 3 to 10 wt. %.

Carbon may also be impregnated into the gamma-alumina in other ways well-known in the art. For example, carbonaceous material may be melted and vacuum-impregnated into the gamma-alumina.

Following the impregnation step, the loaded gamma-alumina extrudate may be optionally dried to remove most of the solvent. If the solvent is water, drying may be performed at any temperature ranging from about 70° to 200° C. and preferably about 100° to 120° C. The upper boundary of drying temperature is to insure that no decomposition of the carbonaceous material occurs prematurely. The time of drying is not critical, although at least about 1 hour is employed for substantially complete drying and drying overnight (about 16 hours) may be convenient. Drying is not necessary if the carbonaceous material is melted and vacuum impregnated, however.

The impregnated gamma-alumina extrudate is then exposed to a temperature of at least about 400° C. to induce charring of the carbonaceous material. At least about 400° C. must be employed in order to induce substantial charring and to remove volatiles. High temperatures in excess of about 1200° to 1300° C. result in substantial loss of surface area of the alumina. Preferably, charring is performed at about 500° to 800° C., and most preferably at about 550° to 650° C. At least about one-half hour is required for substantially complete charring to occur. Longer times, such as overnight (about 16 hours), may be employed without detriment to the process. Preferably, about 1 to 2 hours is sufficient for charring. The charring operation is carried out in an inert or reducing atmosphere, such as hydrogen, carbon monoxide, helium, argon, nitrogen and the like and mixtures of these.

Following the charring stage, additional carbonaceous material may be injected into the gamma-alumina extrudate and the material re-charred, if desired. This cycle can be repeated a number of times in order to maximize the loading of the gamma-alumina extrudate.

Following charring, the carbonized material is heated to at least about 1150° C. in order to convert the gamma-alumina to alpha-alumina. Temperatures lower than about 1150° C. do not result in substantial conversion of the gamma-alumina to alpha-alumina. While temperatures of about 1200° to 1300° C. may be employed, the resulting alpha-alumina has a lower surface area than that obtained at temperatures of about 1150° to 1200° C. Accordingly, the conversion is preferably carried out between about 1150° and 1200° C., and most preferably at about 1150° C. A time period for conversion of greater than about 2 hours is required to obtain substantially complete conversion, although longer times (e.g., overnight) may be employed without detriment to the process. Preferably, at least about 6 hours are employed. The atmosphere must be inert or reducing, as in the charring process, to prevent oxidation of the carbon deposits in the pores of the alumina.

Following conversion, the carbon must be removed from the alpha-alumina. This is conveniently done by oxidizing the carbon and converting it to a gas at temperatures of at least about 500° C. About 500° C. is the minimum temperature under which carbon is removed. Preferably, carbon removal is carried out at between about 600° and 1000° C., and most preferably between about 700° and 900° C. The time of carbon removal is at least about 15 minutes, and preferably about 1 to 2 hours, although longer times (e.g., overnight) may also be employed without detriment to the process. The carbon removal process is carried out in an oxidizing atmosphere, such as air, oxygen or carbon dioxide or one of the foregoing oxidizing gases diluted in helium, argon, nitrogen or other inert gas, possibly together with water vapor. Preferably, air is employed.

The charring, conversion and carbon removal operations may be carried out at temperatures of between about 1150° and 1200° C. Accordingly, it is possible to combine the charring, conversion and carbon removal in one operation. Air or other oxidizing atmosphere is added at the appropriate time to carry out the carbon removal operation following the conversion.

The surface area of the resulting alpha-alumina is at least about 20 m$^2$/g and is typically at least about 40 to 70 m$^2$/g. The extrudate form is maintained during the conversion of the gamma-phase to the alpha-phase, and the end product remains physically strong, having a crush strength about the same as that of the gamma-alumina extrudate starting material.

The resulting alpha-alumina also has ultra-high thermal stability and can be exposed to temperatures at least as high as about 1000° C. in the presence of steam without substantial loss of surface area. Such ultra-high thermal stability renders the alpha-alumina produced in accordance with the invention particularly useful in high temperature processes, such as those petroleum refining operations requiring temperatures well over 800° C. Examples of such petroleum refining operations include resid cat cracking and steam reforming. The alpha-alumina may be used as a catalyst or as a catalyst support in such processes. Techniques for loading alpha-alumina with metals such as Ni and Co and oxides such as WO$_3$ and MoO$_3$ are well-known to those skilled in the art and form no part of this invention.

EXAMPLES

EXAMPLE 1

The preparation of high surface area (190 m$^2$/g) gamma-alumina in extrudate form where a carbon char was formed in the pores of the extrudate was carried out by the following procedure. A standard sugar solution was prepared by dissolving 250 g of sucrose in 100 ml of distilled water heated at 140° F. A 50 ml portion of this saturated solution was contacted with 100 g of gamma-alumina extrudates of reforming grade purity (Engelhard Industries, Inc.) having an average pore diameter of about 70 Å. This amount of the sugar solution was just that amount which would fill the pore volume of the extrudates. Therefore, this procedure amounted to a quasi-incipient wetness impregnation. The entire amount of material was then dried at 120° C. for 16 hours. Following this overnight drying step, the weight of the extrudates plus the weight of sugar in the pores was 135 g. Therefore, a 35% weight increase occurred due to the sugar impregnation step. The above preparation was then divided into two equal portions. Each portion was then treated in a tube furnace for 16 hours under a blanket of flowing helium to "char" the sugar in the pores of the alumina extrudate. Large quantities of water were removed in this heat treatment step. The weight percent carbon found on a sample from each batch treated at 600° C. was in good agreement, 7.0 and 7.2 weight percent carbon. These two batches were then combined and used in a series of experiments reported in other Examples, as indicated below.

EXAMPLE 2

A few gram portion of the carbonized-alumina of Example 1 was heated in a tube furnace at 1100° C. in a reducing atmosphere of 15% hydrogen in argon to insure that the carbon would not be removed by oxidation. The object of this heat treatment was to convert the gamma-phase to the alpha-phase while maintaining high surface area. The sample was kept at this temperature for 16 hours. The sample was then removed from the tube furnace at ambient temperature. To remove the carbon from the pores of the alumina, the sample was treated in a tube furnace at 680° C. in flowing 20% oxygen in helium at a flow rate of 500 cm$^3$/min for 16 hours. The X-ray diffraction pattern for a powder sample indicated a mixture of two alumina phases (gamma and alpha) to be present for the 1100° C. heat treatment. The surface area of this extrudate was 80.3 m$^2$/g (B.E.T.).

EXAMPLE 3

A few grams of the carbonized-alumina of Example 1 was treated as described in Example 2, except that the conversion temperature was increased to 1125° C. Increasing the temperature to 1125° C. resulted in higher conversion of the gamma-alumina to alpha-alumina based on X-ray diffraction analysis than the 1100° C. treatment of Example 2. Nevertheless, about a third of the gamma-alumina phase was still present following this 1125° C. heat treatment.

EXAMPLE 4

A few grams of the carbonized-alumina of Example 1 was treated as described in Example 2, except that the conversion temperature was increased to 1150° C. Increasing the temperature to 1150° C. resulted in substantially complete conversion of the gamma-alumina phase to alpha-alumina based on the X-ray diffraction pattern of this sample. The surface area of this sample was 37.6 m$^2$/g (B.E.T.). This example, in conjunction with Examples 2 and 3, demonstrates the sensitivity of the gamma-alumina to alpha-alumina phase transformation as a function of temperature. The amount of carbon on this alpha-alumina sample was only 0.06 wt. % following the oxidation (carbon removal) step. This low carbon level indicates that a substantially carbon-free alpha-phase had been produced by the procedure described above.

EXAMPLE 5

A few grams of the carbonized-alumina of Example 1 was treated as described in Example 2, except that the high temperature heat treatment was increased to 1200° C. The X-ray diffraction pattern of this sample was quite similar to that of Example 4. This indicates that the 1150° C. treatment temperature was very near to the lower temperature limit which converts the alumina described in Example 1 to the alpha-phase. The surface area of the alpha-alumina produced by the above 1200° C. conversion was 21.3 m$^2$/g (B.E.T.).

EXAMPLE 6

Instead of using a few grams of the carbonized-alumina, 70 g of the material produced in Example 1 was heat treated at 1150° C. as in Example 4. However, instead of an oxidation at 680° C. to remove the carbon, an oxidation at 892° C. for 16 hours in 20% oxygen in helium at 500 cm$^3$/min was used. As in Example 4, X-ray analysis of this sample showed substantially complete conversion of gamma-alumina to alpha-alumina. Also, the surface area of this sample was found to be 43.2 m$^2$/g (B.E.T.). This example demonstrates two points. First, a high surface area alpha-alumina in extrudate form can be prepared in a reproducible fashion as described in Example 4 by conversion at 1150° C. Second, the alpha-alumina produced in this example was stable to oxidation at 892° C. It should be noted that the oxidation temperature was about 200° C. higher than for the sample of Example 4; nevertheless, the resulting surface area was slightly higher.

EXAMPLE 7

A 100 g portion of carbonized-alumina was prepared as in Example 1. A 3 g portion of the material was treated as in Example 2, except that the conversion was carried out at 1150° C. for 2 hours. The X-ray diffraction pattern for a powder sample of the alumina so prepared indicated a mixture of gamma- and alpha-phases (about one-third gamma). The surface area of this sample was 97.2 m$^2$/g (B.E.T.). Another 3 g portion was treated as described above, except that the time of conversion was 6 hours. The X-ray diffraction pattern for a powder sample indicated substantially complete conversion from the gamma- to the alpha-phase.

EXAMPLE 8

A 3 g portion of the material prepared in Example 7 was treated as in Example 2, except that the conversion was carried out at 1300° C. and the oxidation was carried out at 700° C. The X-ray diffraction pattern for a powder sample indicated substantially conversion to the alpha-phase. The surface area of the sample was 24.6 m$^2$/g (B.E.T.).

EXAMPLE 9

A repeat preparation of that described in Example 1 was carried out, except that the batch size was increased to 200 g of gamma-alumina. The sugar-impregnated alumina was treated at 1150° C. as described in Examples 4 and 6. For this preparation, two 100 g batches of material were used instead of just a few grams as described in Examples 2-5. Also, instead of the oxidation at 680° C. to remove the carbon, oxidation at 872° C. in 20% oxygen in helium for 16 hours was used, as described in Example 6. The conversion of the gamma-alumina to the alpha-alumina phase was substantially complete, as shown by X-ray analysis of a portion of each batch. The surface areas of a sample from each batch were found to be 38.0 and 25.7 m$^2$/g. Despite some variation in the surface area of the material produced in this example, the alpha-alumina clearly evidenced good surface area stability following the oxidation at 872° C.

EXAMPLE 10

A repeat preparation (100 g) of carbonized-alumina was carried out as described in Example 1. The material was treated as described in Example 6. The surface area of this sample was 66.5 m$^2$/g (B.E.T.). The alpha-alumina produced in this example was stable to a 900° C. oxidation treatment.

EXAMPLE 11

A 3 g portion of the material prepared in Example 10 was treated for 2 hours at 1000° C. in air sparged through water at a space velocity of 100 cm$^3$/min. The X-ray diffraction pattern was unchanged compared to the sample of Example 7. The surface area was 43.4 m$^2$/g (B.E.T.) for the sample of this example. The relative stability of the surface area of alpha-alumina under extreme steaming conditions constitutes a potential for application of this material to catalytic applications previously unrecognized.

EXAMPLE 12

Another 3 g portion of the material prepared in Example 10 was treated as described in Example 11 except that the steaming temperature was increased to 1100° C. The X-ray diffraction pattern was essentially unchanged as compared to Example 8. The surface area was 11.8 m$^2$/g (B.E.T.). This decrease in surface area indicates that the surface area stability of the alpha-alumina of the present invention lies between about 1000° and 1100° C.

EXAMPLE 13

Another 3 g portion of the material prepared in Example 10 was treated as described in Example 11, except that the steaming temperature was increased to 1200° C. The X-ray diffraction pattern was essentially unchanged as compared to Example 7. The surface area was 6.65 m$^2$/g (B.E.T.). For comparison, the gamma-alumina used to prepare the alpha-alumina of Example 6 had a surface area of 190 m$^2$/g (B.E.T.). When the gamma-alumina was heat treated at 1200° C. under the comparatively mild conditions of dry air, a surface area of only 5 m$^2$/g (B.E.T.) was obtained.

EXAMPLE 14

An attempt was made to prepare alpha-alumina in powder form using a different procedure to that described in Examples 1-13. Instead of putting carbon into the pores of the alumina, alumina was prepared on the surface of a carbon support. To 100 g of a high purity carbon (Carbolac) was added 92.1 g of Al(NO$_3$)$_3$·9H$_2$O dissolved in 150 ml of H$_2$O. This solution was added by two sequential incipient wetness impregnations. The sample was then dried at 110° C. for 16 hours, and then calcined at 300° C. for 2 hours to decompose the nitrate salt. An 11.44 g portion of the above preparation was then heated at 1200° C. for 18 hours, as described in Example 2. The carbon was then removed by oxidation at 872° C. for 18 hours. The X-ray scans of this sample clearly showed a mixed phase of gamma-alumina and alpha-alumina. The surface area of this material was 138 m$^2$/g (B.E.T.) This example demonstrates the importance of the type of preparation used in producing an alpha-alumina phase. It should be noted that this preparation procedure failed to give complete conversion, whereas the preparation procedure described in Examples 4-10 for alumina extrudates resulted in complete formation of the α-phase. It should also be noted that 1200° C. heat treatment described in this example was identical to that employed in Example 5.

EXAMPLE 15

A 43 g portion of a wide pore (average pore diameter 131±2 Å) gamma-alumina of high purity in extrudate form (an experimental material with a uniquely narrow pore distribution available from Union Carbide Corp.) was impregnated with 32.25 ml of a sucrose solution, as described in Example 1. The sample was then treated as described in Example 2, except the conversion temperature was 1150° C. and the oxidation temperature was 888° C. The X-ray scan of this sample showed incomplete conversion of gamma-alumina to alpha-alumina. The surface area of this sample was 138 m$^2$/g (B.E.T.). This example demonstrates that temperature conditions which convert a gamma-alumina of narrow pore diameter to the alpha-phase (Example 4) are insufficient to convert a gamma-alumina of wide pore diameter to the alpha-phase.

EXAMPLE 16

The 38.5 g sample from Example 15 was re-impregnated with a sucrose solution following the procedure described therein. The sample was then treated as described in Example 2, except the conversion temperature was 1200° C. The sample was subsequently treated as described in Example 15. The X-ray scan of this sample again showed incomplete conversion of gamma-alumina to alpha-alumina.

What is claimed is:

1. A process for preparing ultra-stable, high surface area alpha-alumina which comprises:
   (a) impregnating high surface area gamma-alumina extrudate having a narrow average pore size of about 20 to 100 Angstroms with a solution of a sufficient quantity of a carbonaceous material such that following step (b) below, the amount of carbon formed ranges from about 1 to 25 wt. % of alumina;
   (b) carbonizing the carbonaceous material at a temperature of about 400° to 1300° C. for a period of time of at least about 0.5 hours in an inert or reducing atmosphere;
   (c) converting the gamma-alumina substantially completely to alpha-alumina at a temperature of about 1150° to 1200° C. for a period of time of greater than about 2 hours in an inert or reducing atmosphere; and
   (d) removing the carbon at a temperature of about 500° to 1200° C. for a period of time of at least about 0.25 hours in an oxidizing atmosphere, thereby forming an alpha-alumina having a surface area of at least about 20 m$^2$/g and capable of withstanding temperatures at least as high as about 1000° C. in the presence of steam without substantial loss in surface area.

2. The process of claim 1 in which the carbonaceous material is a starch or sugar.

3. The process of claim 2 in which the carbonaceous material is sucrose in aqueous solution.

4. The process of claim 1 in which the gamma-alumina is contacted with an aqueous solution of carbonaceous material and is then dried at about 70° to 200° C. for a period of time of at least about 1 hour.

5. The process of claim 1 in which the carbonizing is carried out at a temperature of about 500° to 800° C. for about 1 to 2 hours.

6. The process of claim 5 in which the temperature of carbonizing ranges from about 550° to 650° C.

7. The process of claim 1 in which the atmosphere employed during carbonizing is at least one selected from the group consisting of hydrogen, carbon monoxide, helium, argon and nitrogen.

8. The process of claim 1 in which the conversion is carried out for a period of time of at least about 6 hours.

9. The process of claim 8 in which the conversion is carried out at about 1150° C.

10. The process of claim 1 in which the atmosphere employed during conversion is at least one of hydrogen, carbon monoxide, helium, argon and nitrogen.

11. The process of claim 1 in which the carbon removal is carried out at a temperature ranging from about 600° to 1000° C. for about 1 to 2 hours.

12. The process of claim 11 in which the temperature ranges from about 700° to 900° C.

13. The process of claim 1 in which the carbon removal is carried out in an oxidizing atmosphere of air, oxygen or carbon dioxide or mixture of an oxidizing atmosphere with helium, argon or nitrogen.

14. The process of claim 1 in which the carbon content ranges from about 3 to 10 wt. %.

* * * * *